Patented Oct. 18, 1932

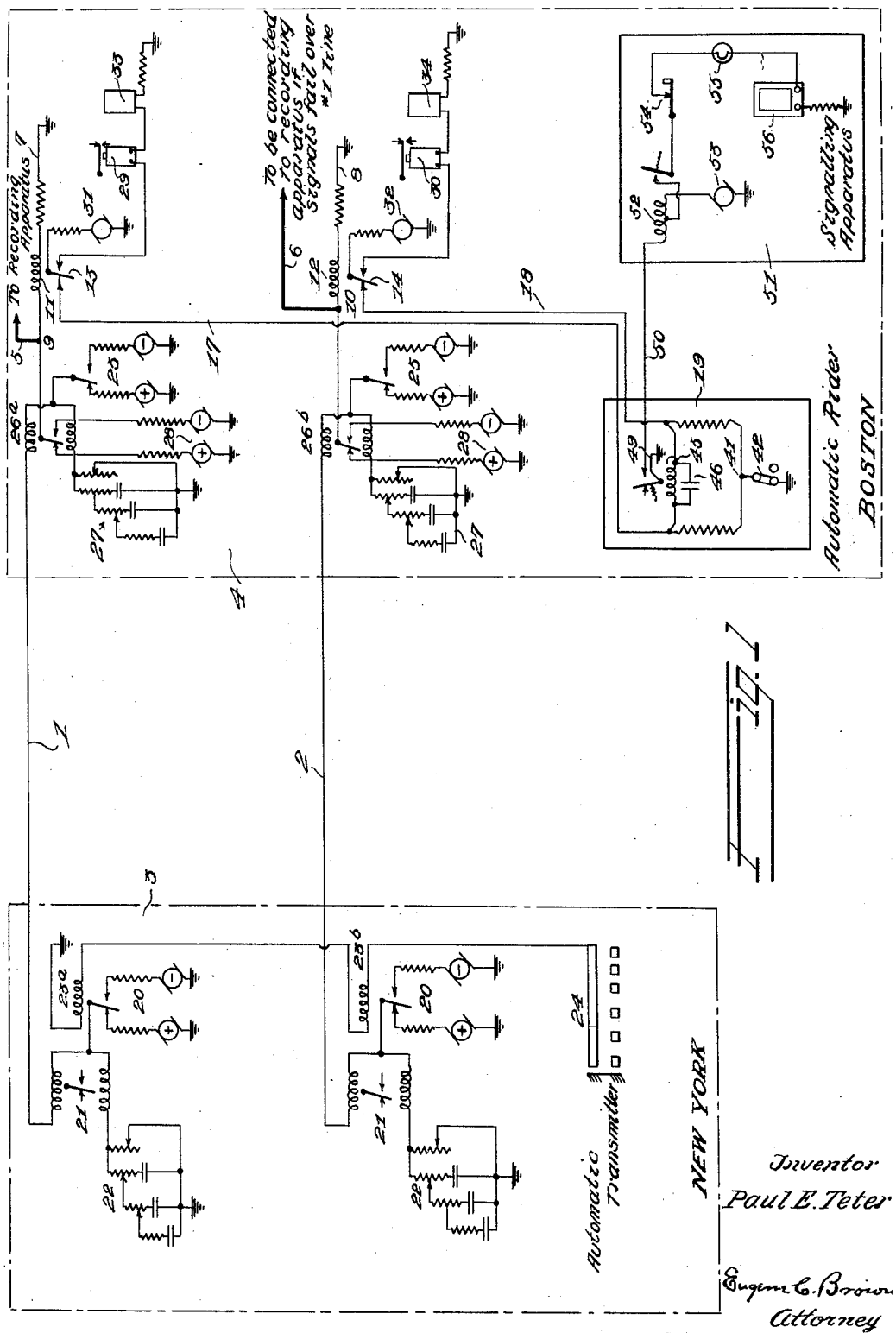

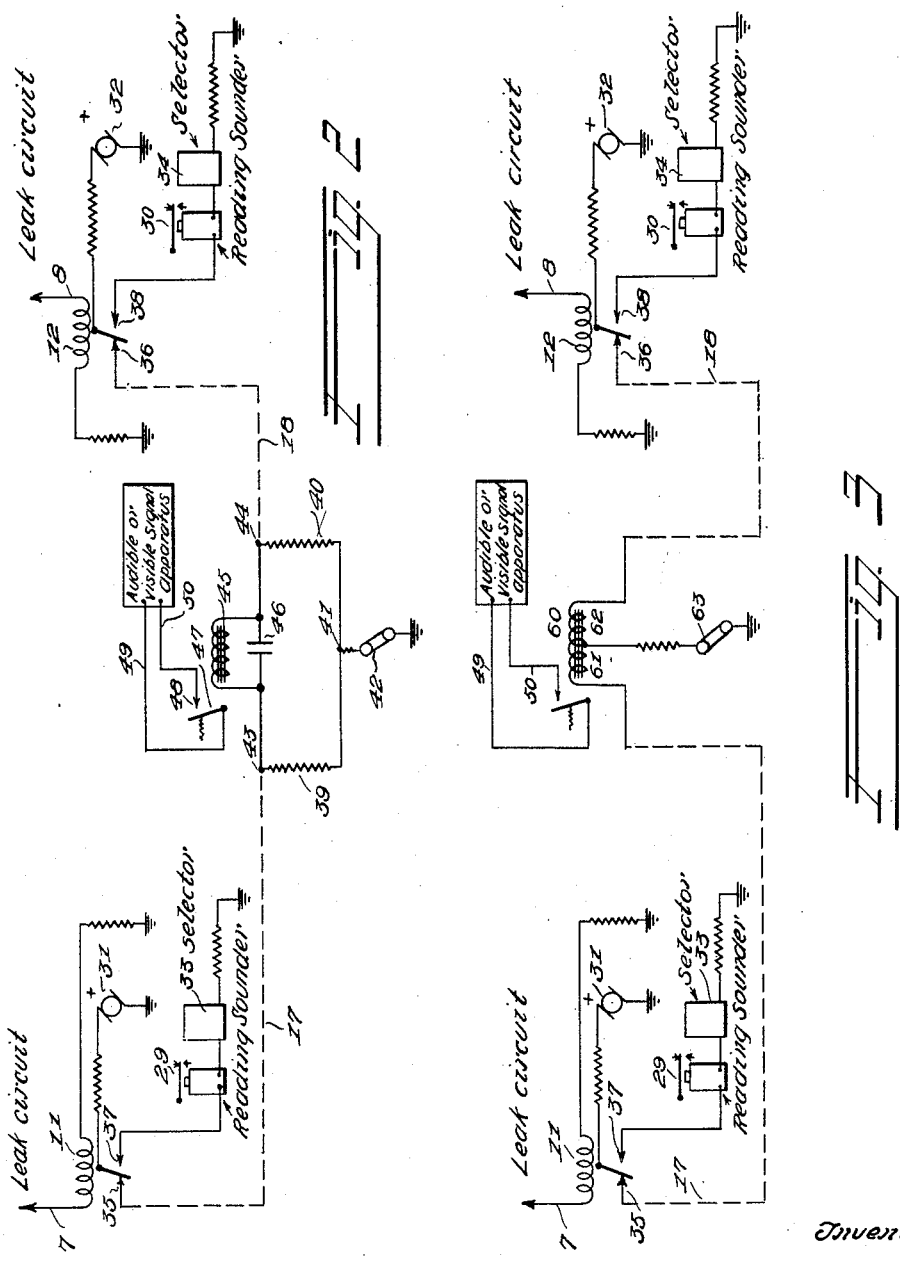

1,883,102

UNITED STATES PATENT OFFICE

PAUL E. TETER, OF PLAINFIELD, NEW JERSEY, ASSIGNOR TO THE WESTERN UNION TELEGRAPH COMPANY, OF NEW YORK, N. Y., A CORPORATION OF NEW YORK

AUTOMATIC RIDER CIRCUITS

Application filed August 20, 1930. Serial No. 476,679.

This application relates to telegraph circuits and in particular to a method of and means for providing dependable duplicate circuit facilities. In particular it relates to an automatic rider and circuit therefor designed to give an indication when either one of the duplicate circuits fails.

On certain important telegraph circuits, manual or automatic, especially those employed for stock market quotation service, it is not an unusual practice to provide duplicate circuit facilities.

The second circuit is generally referred to as the "fall back" circuit. To derive the full benefit of such an arrangement, it is essential that the "fall back" circuit receive the same maintenance as the "first" circuit or the one to which the printers are connected.

It is not likely that both circuits will fail simultaneously. When the "first" circuit is interrupted, the printers are then connected to the "fall back" circuit. The trouble on the first circuit can then be remedied, whereupon it becomes a "fall back" circuit.

In order to maintain such a duplicate service, the attention of an attendant is generally required. The attendant must check the incoming signals over both circuits, either by monitoring sounders or by comparing the copy of two printers, one operating from each circuit.

An arrangement herein referred to as "automatic rider," renders it unnecessary to provide an attendant for such work except at times when there is actually an interruption. It is necessary, however, that the signals be received in phase or nearly so.

The automatic rider includes a relay which is made differential in operation in response to variations in the current of one or the other of the duplicate telegraph circuits. Two specific embodiments of the automatic rider are disclosed. In one, the relay is connected to equipotential terminals of a pair of matched resistances the flow of current through which is under the control of the respective telegraph circuits. In the other the relay is given an additional winding differentially opposed to the first winding so that the relay is normally unoperated but becomes energized upon a change in current in one or the other of the differential windings.

The objects of the invention are to safeguard against interruptions due to wire failures or equipment trouble.

One of the advantages of using the automatic rider of this invention is that it is no longer necessary for the attendant to compare the incoming signals on the two lines, but this is done automatically by the rider circuit, which causes operation of an audible or visible signal when incoming signals are no longer received alike on both circuits.

Figure 1 represents two telegraph circuits, equipped with an automatic rider, such as are actually in use, in a modified form, between New York and Boston.

Figures 2 and 3 show details of two forms of automatic rider and the circuits which control their operation.

In Figure 1 the terminal apparatus at the transmitting end of lines 1 and 2 is represented diagrammatically within the rectangle 3. This terminal apparatus may comprise a pair of duplex terminal sets and an automatic transmitter designed to transmit the same signals into the two duplex terminal sets.

The terminal apparatus at the receiving end of line 1 and 2 is represented diagrammatically within the rectangle 4. This terminal apparatus may comprise a pair of duplex terminal sets and means to retransmit the received signals into recording or other receiving circuits 5 and 6 to either or each of which a printer may be connected.

The leak circuits 7 and 8 shown in Fig. 1 are connected to the recording circuits at junctions 9 and 10, respectively. These leak circuits comprise leak relays 11 and 12 the operation of which will be described in detail in connection with Figure 2. The armatures 13 and 14 of relays 11 and 12 are permanently connected to generators 31 and 32, respectively. Each relay includes marking and spacing contacts, the spacing contacts being connected to conductors extending to apparatus which is hereinafter referred to as an automatic rider. The two conductors are designated by the numerals 17 and 18, and the automatic rider by the numeral 19. From the automatic rider 19 a conductor 50 extends to signaling apparatus 51, the operation of relay 52 of the signalling apparatus serving to close a locking circuit which extends from grounded generator 53, through relay 52 and its contacts, a push button 54, lamp 55 and buzzer 56 to ground. The push button 54 serves for opening the locking circuits after the signal is received.

As will be explained in greater detail hereinafter, the operation of the signaling apparatus indicates that one of the telegraph circuits has suffered an interruption or other disturbance necessitating readjustment of the line or apparatus by the attendant in charge.

The particular type of terminal apparatus used in the system is no part of this invention, but is shown merely for the sake of clearness in explaining the operation of a system incorporating the automatic rider of this invention.

Within the rectangle 3 is shown a pair of duplex terminal sets each comprising transmitter 20, receiving relay 21, an artificial line 22 designed to balance its transmission line over the range of signaling frequencies. The artificial line may be of any desired form but is illustrated as made up of resistance and capacity. The transmitter 20 is represented diagrammatically as comprising a pair of generators arranged to supply positive and negative current to the junction of the two windings of the receiving relay 21. The connection of the generators to line and artificial line by way of the two windings of receiving relay 21 is under control of a relay the armature of which is connected to the common terminal of the windings of relay 21. The relay which controls the transmission over line 1 is designated 23a and that which controls the transmission over line 2 is designated 23b. The windings of relays 23a and 23b are connected in series to ground, on the one hand, and, on the other hand, to an automatic transmitter indicated diagrammatically at 24.

It will be obvious that signals are transmitted into the two duplex terminal sets from the automatic transmitter by reversals of current through the relay windings 23a and 23b, which reversals cause corresponding reversals in the current supplied to lines 1 and 2 by transmitters 20. In this way the same signals are transmitted over the lines 1 and 2.

The receiving apparatus included in the rectangle 4 is diagrammatically represented as comprising a pair of duplex terminal sets generally similar to those at the transmitting end. A transmitter 25 is connected in non-interfering relation with its receiving relay by means of a balancing artificial line 27. The receiving relay for line 1 is designated 26a and that for line 2 as 26b. Each receiving relay controls the circuit of a pair of generators 28 adapted to be connected to the circuit of the recording or other receiving apparatus, to apply thereto current reversals corresponding to the current reversals incoming from the associated telegraph line.

The current reversals effected by relay 26a are transmitted to junction 9 and there supplied to the recording apparatus connected to recording circuit 5. A portion of the current leaks over the path 7 in which the leak relay 11 is connected.

Similarly, the current reversals effected by the receiving relay 26b in response to current reversals on line 2, are applied at junction 10 to the recording circuit 6, to which a printer may or may not at the time be connected. If line 2 is acting as the "fall back" circuit, a printer will ordinarily not be connected to the circuit 6 until an interruption occurs in line 1; when line 1 fails the attendant then switches the printer over from line 1 to line 2. A portion of the signal current leaks from junction 10 through leak relay 12 over the path 8 to ground.

The leak currents which flow from junctions 9 and 10 to ground through the relays 11 and 12 are adapted to serve a double purpose. Through the "marking" contacts of relays 11 and 12, they reproduce the signal in monitoring or supervisory apparatus such as reading sounders 29 and 30 which are supplied with current from sources 31 and 32, respectively. The monitoring circuit includes source 31 (or 32), the armature and marking contact of relay 11 (or 12), sounder 29 (or 30), selector 33 (or 34) and ground.

Through the "spacing" contacts of relays 11 and 12 currents are supplied in phase from the sources 31 and 32 over the conductors 17 and 18 to the automatic rider 19, which is shown in greater detail in Fig. 2.

In Fig. 2 the same reference numerals are used for like parts as those in Fig. 1. Leak circuits 7 and 8 are like the leak circuits in Fig. 1 which extend from junctions 9 and 10 respectively. These leak circuits are indirectly controlled by the signal currents on lines 1 and 2 through the receiving relays 26a and 26b as already explained. The leak circuits comprise relays 11 and 12 having spacing contacts 35 and 36, and marking contacts 37 and 38 respectively. The circuit through marking contact 37 extends from grounded generator 31, armature of relay 11 and contact 37, sounder 29 and selector 33 to ground. The circuit through marking contact 38 extends from grounded generator 32, armature of relay 12, contact 38, sounder 30 and selector 34 to ground.

The spacing contacts 35 and 36 extend by way of conductors 17 and 18 to matched resistance 39 and 40, which are joined at a common terminal 41 and there connected to ground through a switch 42. The other terminals of the matched resistances are indicated at junctions 43 and 44. Across these terminals is connected the winding of a relay 45. A condenser 46 is connected across relay winding 45. The armature 47 and contact 48 of relay 45 are connected to conductors 49 and 50 of a local circuit controlling the operation of an audible or visible signal, as explained in connection with Fig. 1.

The operation of the circuit of Figs. 1 and 2 is as follows: When the same signals are being transmitted over circuits 1 and 2, they are repeated by receiving relays 26a and 26b of Fig. 1 into the recording circuits 5 and 6, and in this way signal currents of like phase flow into the leak circuits 7 and 8. Relays 11 and 12 are thereby operated, and oscillation of the armature of the leak relay closes the marking and spacing contacts alternately. The operation of the marking contacts causes the signals to be reproduced at the reading sounders 29 and 30. Operation of the two spacing contacts in synchronism will have no effect on the relay 45 of the automatic rider, since this relay is connected to points 43 and 44 which are at equal potential when the signals are in phase. Should line 1, to which the printer is connected, fail, because of wire failure or equipment trouble, signals will no longer be received in phase and the relays 11 and 12 will no longer be operated in synchronism. As a result, the junctions 43 and 44 will no longer have the same potential and a current will flow through the winding of relay 45. Closure of the signaling circuit at contacts 47, 48 will complete the circuit of the signaling apparatus connected to conductors 49 and 50, to signal to the attendant the failure of one of the two duplicate circuits.

The form of automatic rider shown in Figure 3 differs from that shown in Fig. 2 in that it comprises a differential relay 60 in place of relay 45.

In Fig. 3 the same numerals are used to indicate elements and parts similar to those found in Fig. 2. A leak circuit 7 extends from the junction 9 in Fig. 1 to leak relay 11, and leak circuit 8 extends from junction 10 in Fig. 1 to leak relay 12. When the armature of relay 11 is on its right hand or marking contact a circuit is closed from generator 31 through sounder 29 and selector 33 to ground. Similarly, when the armature of relay 12 is on its right hand or marking contact a circuit is closed from generator 32 through sounder 30 and selector 34 to ground.

The distinguishing feature of the automatic rider of Fig. 3 lies in the fact that the conductors 17 and 18 extend from the spacing contacts 35 and 36 of relays 11 and 12 through opposed windings 61 and 62, respectively, of a differential relay 60, instead of through matched resistances. The junction of differential windings 61 and 62 is grounded through a switch 63. The armature of relay 60 controls contacts connected to conductors, such as 49 and 50, which extend to the attendant's audible or visible signal apparatus.

The operation of the circuits of Fig. 3 is obvious. When signals are received over the two leak circuits in unison the spacing contacts of the leak relays close, and complete circuits through the differential windings of relay 60. These windings are adjusted to balance each other so that the relay armature, which is normally held in inoperative positive by a retractible spring, will not operate when the signals are received in phase or nearly so. If one of the lines fails, however, the current in one relay winding is not balanced by the current in the other relay winding, and the unbalanced current causes the relay to operate. Energization of the relay 60 causes the attendant's signal to operate and thus indicate that one of the lines requires readjustment.

I claim:

1. In combination, a pair of telegraph circuits, means to transmit the same signals simultaneously over both circuits, a signal device and means responsive to the differential action of signals received over said circuits for controlling the operation of said signal device.

2. In combination, a pair of telegraph circuits, means to transmit the same signals simultaneously over both circuits, a signal device and means responsive to the unequal transmission of said signals over said circuits for operating said signal device.

3. In combination, a pair of telegraph circuits, means to transmit the same signals over both circuits, a signal device, means for maintaining said signal device unoperated when the same signals are received in phase over both circuits, and means for operating said signal device when said signals are not received in phase.

4. In combination a plurality of telegraph circuits, means for transmitting the same signals over said circuits, a receiving relay for each circuit, signal receiving apparatus for each circuit under individual control of said receiving relays and an indicator under the joint control of said receiving relays.

5. In combination a pair of telegraph circuits, a signal transmitter for each circuit, means for operating said signal transmitters to transmit the same signals over both said telegraph circuits, a signal receiving relay for each of said circuits, a signal recorder under control of each of said signal receiving relays, an indicator and means under joint control of said signal receiving relays for normally holding said indicator in unoperated condition.

6. In combination a plurality of telegraph circuits, means for transmitting the same signals over said circuits, receiving apparatus for each of said circuits, a signal device and means operative when either receiving apparatus fails for actuating said signal device.

7. In combination a plurality of telegraph circuits, means for transmitting the same signals over said circuits, a signal receiving relay for each of said circuits, a signaling device adapted to signal the condition of inoperativeness of either of said signal receiving relays, and means for holding said signaling device in unoperated condition when both said signal receiving relays are operated.

8. In combination a plurality of telegraph lines, means for transmitting the same signals over said lines, a signal receiving relay for each of said lines, a signal recorder circuit under control of each of said relays, a leak circuit including a leak relay connected to each of said signal recorder circuits, a signal device and means under control of both leak relays for operating said signal device.

9. In combination a plurality of telegraph lines, means for transmitting the same signals over said lines, a signal receiving relay for each of said lines, a signal recorder circuit under control of each of said relays, a leak circuit including a leak relay connected to each of said signal recorder circuits, a signal device, an automatic rider under control of both leak relays and responsive to the deenergization of one of said receiving relays to operate said signal device.

10. In combination a plurality of telegraph lines, means for transmitting the same signals over said lines, a signal receiving relay for each of said lines, a signal recorder circuit under control of each of said relays, a leak circuit including a leak relay connected to each of said signal recorder circuits, a signal device, an automatic rider under control of both leak relays and responsive to the deenergization of one of said leak relays to operate said signal device.

11. In combination, a receiving apparatus designed to receive the same signals over a pair of different conductors, recording apparatus for each line conductor, a leak circuit connected to each recording apparatus and an automatic rider under joint control of said leak circuits, said automatic rider comprising a pair of matched resistances having a common terminal and separate terminals normally adapted to be maintained at equal potentials, a relay connected to the equi-potential terminals of said resistances, and signaling means under control of said relay.

12. In combination a receiving apparatus designed to receive the same signals over a pair of different conductors, recording apparatus for each line conductor, a leak circuit connected to each recording apparatus and an automatic rider under joint control of said leak circuits, said automatic rider comprising a relay having differential windings under control of said leak circuits respectively, a signaling device normally maintained unoperated through the balanced action of said differential windings but operable upon change in current in one of said differential windings.

In testimony whereof I affix my signature.
PAUL E. TETER.